April 20, 1926. 1,581,884
R. C. STEUART ET AL
STEERING WHEEL HEATER
Filed Jan. 8, 1925 2 Sheets-Sheet 1
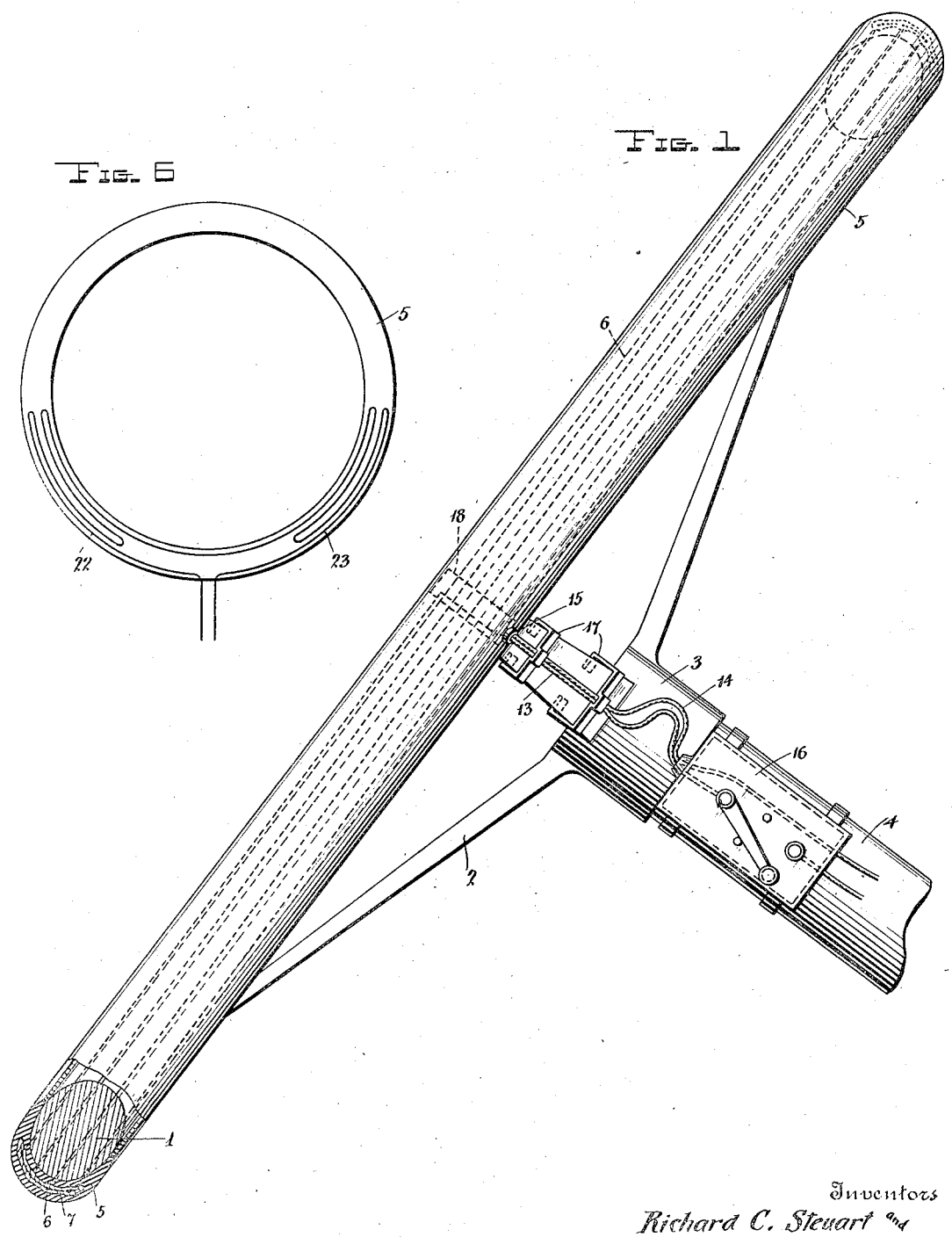
Inventors
Richard C. Steuart and
Bennett B. Cockey.
By
Attorney

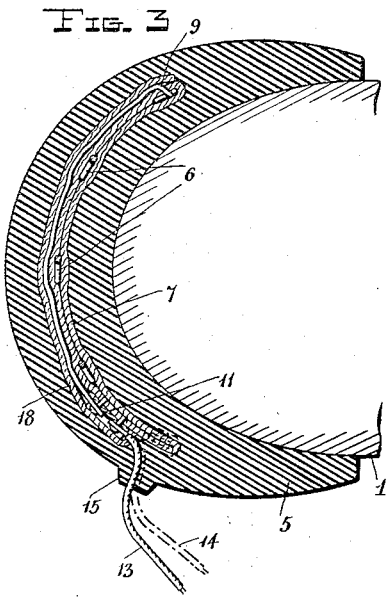
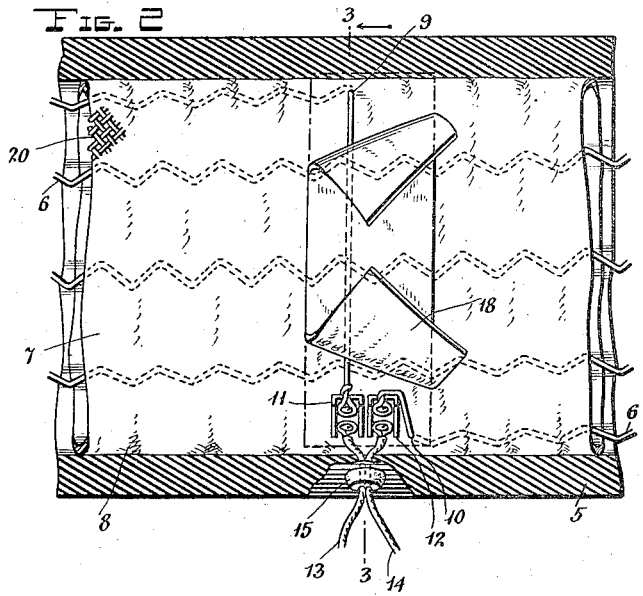
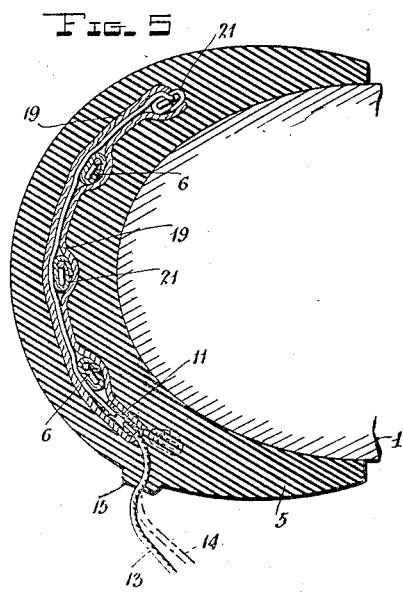
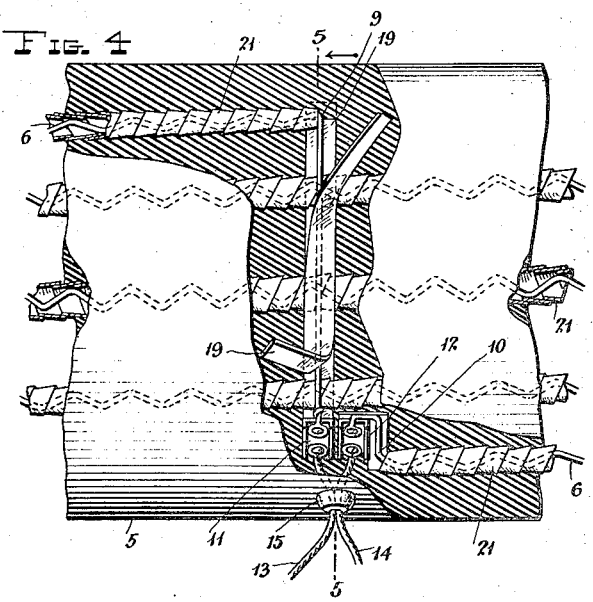

Patented Apr. 20, 1926.

1,581,884

UNITED STATES PATENT OFFICE.

RICHARD C. STEUART, OF TOWSON, AND BENNETT B. COCKEY, OF COCKEYSVILLE, MARYLAND.

STEERING-WHEEL HEATER.

Application filed January 8, 1925. Serial No. 1,217.

*To all whom it may concern:*

Be it known that we, (1) RICHARD C. STEUART and (2) BENNETT B. COCKEY, citizens of the United States, residing at (1) Towson, (2) Cockeysville, in the county of Baltimore and State of Maryland, have invented new and useful Improvements in Steering-Wheel Heaters, of which the following is a specification.

This invention relates to a hand warming attachment for the steering wheels of auto vehicles and has for one of its objects the provision of means elastically embracing the rim of the steering wheel, said means including an electric rheostat energized from some suitable source such as the starting battery of an automobile.

Another object of the invention is to provide a heating device in which the casing portion is continuous circumferentially of the steering wheel and of substantially the same diameter throughout, so that although the heating element may occupy only those arcuate portions of the casing which are normally gripped by the hand in the act of rectilinear steering, the hand may pass to other portions of the casing, in turning curves, without it being necessary to alter the nature of the grip upon the steering wheel, this being a feature that promotes safe driving.

Incidental objects of the invention are the construction of an elongatable heating element and an elongatable insulating sheath therefor, both of which elements are expansively responsive to the stretching of the attachment when the latter is applied to the steering wheel.

Other objects of the invention will appear as the following description of a preferred embodiment thereof proceeds.

In the drawings:—

Figure 1 is a side elevation of a steering wheel equipped with the device of our invention.

Figure 2 is a section showing details of the rheostat.

Figure 3 is a cross section taken along the line 3—3 of Figure 2.

Figure 4 is a section showing details of another form of rheostat.

Figure 5 is a cross section taken along the line 5—5 of Figure 4.

Figure 6 is a diagrammatic representation of a modified form of the invention.

Referring now in detail to the several figures, the numeral 1 represents the rim of a steering wheel supported by the spider arms 2 which emanate from a rotatable hub 3 carried adjacent the upper end of the steering post 4. The device of the invention consists of a casing 5 of elastic material, and annular in form adapted to be slipped upon the rim of the steering wheel, said casing carrying the heating elements 6 of a rheostat and affording a heated hand-hold for the driver of the auto vehicle.

In its preferred form, the circular space within the casing 5 is of slightly smaller diameter than the diameter of the rim which it is designed to encompass so that the casing must be stretched in order to apply it to said rim, the advantage of this construction being that the casing, when in place maintains its position by a strong frictional engagement between itself and the rim of the steering wheel.

In the embodiment of the invention illustrated in Figures 1, 2 and 3, the rheostat consists of a plurality of turns of zig-zag heating element 6 encased in a sheath 7 of woven asbestos or other suitable heat and electrical insulating material, said sheath with the enclosed heating element being preferably embedded within the mass of the casing 5, and the latter which is preferably of rubber, being subsequently vulcanized, forming the casing and rheostat into a substantially unitary structure.

In order to bring about the practical accomplishment of the purpose of the present invention it is essential that the heating element and the insulating sheath in which it is enclosed should stretch with the casing when the latter is applied to the rim of the steering wheel. The heating element is therefore preferably made in a form in which it is inherently resiliently elongatable, being zig-zag, as shown, or if desired wound in the form of a spiral spring, and the sheath may be formed of a loosely woven mesh, as shown at 20 in Figure 2 or initially crowded into position within the casing, forming slight wrinkles or corrugations 8 which become smoothed out when the sheath is stretched in the act of expanding the casing over the rim of the steering wheel.

In Figure 2 is shown a construction in which the heating element consists of four turns running around peripherally of the steering wheel, the ends of said turns emerging from the insulating sheath at the points 9 and 10 and being brought into convenient proximity, said ends being suitably attached to connectors 11 and 12, from which connectors the insulated wires 13 and 14 lead, through a suitable apertured boss 15 or its equivalent formed on the casing, to a switch 16, best shown in Figure 1 by which the current flowing through the rheostat may be controlled. The switch is in circuit with any suitable source of electric energy, not shown, such as the starting battery of the auto vehicle. The wires leading from the casing to the switch may be conveniently run along the underside of one of the spider arms 2, as shown in Figure 1, and held in place by clips 17.

In that embodiment of our invention illustrated in Figures 4 and 5 the common sheath of insulation material is dispensed with, and individual insulation sheaths provided for the several convolutions of the heating element. In this case, elongatability is secured by making the sheaths in the form of an overlapped flat spiral 21 of asbestos tape, the folds of which are independent of one another and relatively movable so that the sheath and the zig-zag heating element which it encloses can stretch simultaneously with the expansion of the elastic casing. In the forms shown both in Figures 2 and 3 the ends of the heating element which extend exteriorly of the sheath are protected from direct contact with the rubber casing by means of pieces of sheet asbestos 18 and 19 respectively, laid in place before the casing and its contained parts are vulcanized together.

It may not be desirable in all instances to have the rheostat extend completely around the casing. In Figure 6 we have illustrated a form of the invention in which the rheostat is represented by the coils 22 and 23 of heating element which occupy only those portions of the casing which are normally gripped when the auto vehicle is being steered in rectilinear directions. The casing then extends completely around the steering wheel and is elastically applicable thereto as in the previously described modifications. The diameter of the casing is maintained substantially uniform throughout both those portions which contain the rheostat and those parts where the rheostat is absent so that the hand may be slipped along the rim of the steering wheel, in the act of steering the auto vehicle around curves without it being necessary to change the nature of the grip of the hand upon the steering wheel when removing it from those portions where the rheostat is present to the unheated portion of the casing. This promotes safe driving for it is unnecessary for the driver to clutch the rim of the steering wheel with a tighter grip, as has been formerly necessary when moving the hands from heating devices of relatively large diameter to parts of the steering wheel of smaller diameter.

While we have herein illustrated and described what we believe to be a practical embodiment of our invention it is to be understood that the detailed construction here shown is merely illustrative of one form in which the invention can be exemplified and that numerous alternative constructions, or changes in the forms of the various details and parts can be made, without departing from the scope of the invention as defined in the appended claims.

Having described our invention what we claim as new and desire to secure by Letters Patent, is:—

1. A steering wheel heater comprising a rim receiving endless annular casing of elastic material open on its inner side, the circular space surrounded by the annulus formed by said casing being of smaller diameter than the rim of the steering wheel which the casing is designed to embrace, necessitating the circumferential stretching of said casing to apply it to said rim, and a rheostat forming a part of said casing, said rheostat being constructed to elongate circumferentially when said casing is stretched.

2. A steering wheel heater comprising a rim receiving endless annular casing of elastic material open on its inner side, the circular space surrounded by the annulus formed by said casing being of smaller diameter than the rim of the steering wheel which the casing is designed to embrace, necessitating the circumferential stretching of said casing to apply it to said rim, and a rheostat forming a unitary part of said casing, said rheostat being constructed to circumferentially elongate when said casing is stretched.

3. A steering wheel heater comprising a rim receiving endless annular casing of elastic material open on its inner side, the circular space surrounded by the annulus formed by said casing being of smaller diameter than that of the rim of the steering wheel which the casing is designed to embrace, necessitating the circumferential stretching of said casing to apply it to said rim, a rheostat embedded in said casing, said rheostat being constructed to circumferentially elongate with said casing when the latter is stretched.

4. A steering wheel heater comprising a rim receiving endless annular casing of elastic material open on its inner side, the circular space surrounded by the annulus formed by said casing being of smaller diameter than that of the rim of the steering wheel which the casing is designed to embrace, necessitating the circumferential stretching of said casing to apply it to said rim, a rheostat forming a part of said casing, a heat and electrical insulating sheath surrounding said rheostat within said casing, said rheostat and sheath being constructed to circumferentially elongate with said casing when the latter is stretched.

5. A steering wheel heater comprising a rim receiving endless annular casing of elastic material open on its inner side, the circular space surrounded by the annulus formed by said casing being of smaller diameter than the rim of the steering wheel which the casing is designed to embrace, necessitating the stretching of said casing circumferentially to apply it to said rim, and a rheostat forming a part of said casing.

In testimony whereof we have hereunto set our hands.

RICHARD C. STEUART.
BENNETT B. COCKEY.